United States Patent
Kang et al.

(10) Patent No.: US 9,092,328 B2
(45) Date of Patent: Jul. 28, 2015

(54) TERMINAL CAPABLE OF EXTENDING STORAGE SPACE AND METHOD EXTENDING STORAGE SPACE THEREOF

(75) Inventors: Pil-Seob Kang, Suwon-si (KR); Woo-Jin Park, Yongin-si (KR); Hun-Je Yeon, Seoul (KR); Seong-Il Hahm, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 246 days.

(21) Appl. No.: 13/619,447

(22) Filed: Sep. 14, 2012

(65) Prior Publication Data
US 2013/0073817 A1 Mar. 21, 2013

(30) Foreign Application Priority Data
Sep. 15, 2011 (KR) .................. 10-2011-0092889

(51) Int. Cl.
*G06F 12/06* (2006.01)
*G06F 5/12* (2006.01)
*G06F 13/16* (2006.01)
*G06F 11/34* (2006.01)

(52) U.S. Cl.
CPC .............. *G06F 12/0623* (2013.01); *G06F 5/12* (2013.01); *G06F 11/349* (2013.01); *G06F 12/0684* (2013.01); *G06F 13/16* (2013.01); *G06F 2212/171* (2013.01)

(58) Field of Classification Search
CPC ... G06F 5/12; G06F 12/0683; G06F 12/0684; G06F 2212/1041; G06F 2212/171
USPC .................................................. 711/154, 158
See application file for complete search history.

(56) References Cited

U.S. PATENT DOCUMENTS

| | | | |
|---|---|---|---|
| 6,252,907 B1 | 6/2001 | Hwang | |
| 6,986,019 B1 * | 1/2006 | Bagashev et al. | 711/217 |
| 2002/0124149 A1 * | 9/2002 | Ni | 711/170 |
| 2003/0223415 A1 * | 12/2003 | Saxena et al. | 370/389 |
| 2005/0060420 A1 * | 3/2005 | Kovacevic | 709/231 |
| 2005/0152356 A1 * | 7/2005 | Powers | 370/389 |
| 2005/0239494 A1 * | 10/2005 | Klassen et al. | 455/550.1 |
| 2008/0133929 A1 * | 6/2008 | Gehrmann et al. | 713/179 |
| 2010/0070695 A1 * | 3/2010 | Baek et al. | 711/104 |
| 2011/0060669 A1 * | 3/2011 | Laves | 705/34 |
| 2011/0064084 A1 * | 3/2011 | Tatar et al. | 370/392 |
| 2011/0149777 A1 * | 6/2011 | Robbins | 370/252 |
| 2011/0320718 A1 * | 12/2011 | Szakacsits | 711/118 |
| 2012/0179884 A1 * | 7/2012 | Araki et al. | 711/159 |

FOREIGN PATENT DOCUMENTS

KR    10-2006-0132147    12/2006

* cited by examiner

*Primary Examiner* — Hal Schnee (57) ABSTRACT

A terminal and a method extend a storage space. The terminal includes a contents receiver, an interface, an external memory measure unit, a store determining unit, and a transmission controller. The contents receiver receives contents via a network. The interface accesses at least one external memory. The external memory measure unit measures at least one of a speed of the interface, an available capacity and a use history of the external memory accessed via the interface. The store determining unit determines whether to store the contents in the external memory based on a value measured by the external memory measure unit. The transmission controller controls to transmit the contents to the external memory via the interface when it is determined that the contents are stored in the external memory.

18 Claims, 4 Drawing Sheets

TERMINAL CAPABLE OF EXTENDING STORAGE SPACE AND METHOD EXTENDING STORAGE SPACE THEREOF

CROSS-REFERENCE TO RELATED APPLICATION(S) AND CLAIM OF PRIORITY

The present application is related to and claims priority under 35 U.S.C. §119(a) of a Korean patent application filed in the Korean Intellectual Property Office on Sep. 15, 2011 and assigned Ser. No. 10-2011-0092889, the contents of which are herein incorporated by reference.

TECHNICAL FIELD OF THE INVENTION

The present disclosure relates to a terminal capable of extending a storage space and a method for extending a storage space thereof.

BACKGROUND OF THE INVENTION

As a communication technology develops, not only a wired terminal such as a Personal Computer (PC) but also a wireless terminal such as a mobile phone, a smart phone, etc. can transmit/receive data in high speed via a network. More particularly, recently, it is possible to transmit/receive large capacity multimedia contents in real-time via the network.

Meanwhile, to receive and execute multimedia contents in real-time via the network, a buffer should be installed inside a terminal in order to solve a difference between an execution speed of the terminal and a communication speed of the network.

In case of a wireless terminal, an interference and collision of data may occur in a wireless section, and since a transmission speed of data is not constant depending on time and a place, a disconnection of contents data may occur while a terminal executes contents received via a wireless section.

In addition, in the case where a storage space of a memory installed inside a terminal is not sufficient, a difficulty may occur in securing an available capacity of a buffer inside a relevant memory in order to execute multimedia contents received in real-time.

SUMMARY OF THE INVENTION

To address the above-discussed deficiencies of the prior art, it is a primary object to provide at least the advantages described below. Accordingly, an aspect of the present disclosure is to provide a terminal and a method for extending a storage space thereof, capable of preventing disconnection of contents by accessing an external memory via a Universal Serial Bus (USB) interface, a short distance wireless communication interface, a network interface, etc. installed in the terminal, and extending a buffer required for reproduction of contents using the accessed external memory when receiving and executing large capacity contents such as moving pictures, games, etc. via a network.

In accordance with an aspect of the present disclosure, a terminal capable of extending, a storage space is provided. The terminal includes a contents receiver for receiving contents via a network, an interface for accessing at least one external memory, an external memory measure unit for measuring at least one of a speed of the interface, an available capacity and a use history of the external memory accessed via the interface, a store determining unit for determining whether to store the contents in the external memory based on a value measured by the external memory measure unit, and a transmission controller for controlling to transmit the contents to the external memory via the interface when it is determined that the contents are to be stored in the external memory.

The terminal may further include a buffer for storing a multimedia streaming for the received contents. In this example, the store determining unit may determine to store the contents in the external memory when a capacity of the buffer is insufficient.

The terminal may further include a streaming measure unit for measuring at least one of a speed and a packet size of a multimedia streaming for the received contents. In this example, the store determining unit may compare a value measured by the streaming measure unit with the value measured by the external memory measure unit to determine whether to store the contents on a packet basis.

The terminal may further include an external memory comparator for, when a plurality of memories are accessed via the interface, comparing at least one of an interface speed, an available capacity, and a use history of each external memory, and a priority determine unit for determining a priority of each external memory depending on the comparison result by the external memory comparator.

The terminal may further include a contents retriever for retrieving whether the same contents as the received contents are stored in the external memory.

The terminal may further include a contents execute unit for executing contents stored in the external memory via the interface.

The terminal may further include a data size comparator for comparing a size of the received contents with an available capacity of the external memory, and an external buffer determine unit for, when the available capacity of the external memory is equal to or greater than the size of the contents, determining a portion of the available capacity of the external memory to use as an external buffer.

The terminal may further include a delete history selector for, when the available capacity of the external memory is less than the size of the contents, selecting a history to delete among a use history of the external memory.

The interface may include at least one of a Universal Serial Bus (USB) interface for accessing the at least one external memory via a USB, a short distance wireless communication interface for accessing the at least one external memory using short distance wireless communication including at least one of Bluetooth, Infrared Data Association (IrDA), Zigbee, Ultra Wideband (UWB), and Near Field Communication (NFC), and a network interface for accessing a cloud server connected to the network using at least one of Wi-Fi, Code Division Multiple Access (CDMA), Wideband CDMA (WCDMA), Global System for Mobile Communication (GSM), Long Term Evolution (LTE), and Evolved Packet Core (EPC).

In accordance with another aspect of the present disclosure, a method for extending a storage space of a terminal is provided. The method includes receiving contents via a network, accessing at least one external memory connected via an interface, measuring at least one of a speed of the interface, an available capacity and a use history of the external memory accessed via the interface, determining whether to store the contents in the external memory based on a value measured in the measuring process, and when determining to store the contents in the external memory, controlling to transmit the contents to the external memory via the interface.

Here, the interface may include at least one of: a Universal Serial Bus (USB) interface for accessing the at least one external memory via a USB, a short distance wireless communication interface for accessing the at least one external memory using short distance wireless communication including at least one of Bluetooth, Infrared Data Association (IrDA), Zigbee, Ultra Wideband (UWB), and Near Field Communication (NFC), and a network interface for accessing a cloud server connected to the network using at least one of Wi-Fi, Code Division Multiple Access (CDMA), Wideband CDMA (WCDMA), Global System for Mobile Communication (GSM), Long Term Evolution (LTE), and Evolved Packet Core (EPC).

The method may further include storing a multimedia streaming for the received contents in a buffer. In this example, the determining of whether to store the contents in the external memory may include storing the contents in the external memory when a capacity of the buffer is insufficient.

The method may further include measuring at least one of a speed and a packet size of a multimedia streaming for the received contents. In this example, the determining of whether to store the contents in the external memory may include comparing a value measured by the streaming measuring process with the value measured by the external memory measuring process to determine whether to store the contents on a packet basis.

The method may further include, when a plurality of memories are accessed via the interface, comparing at least one of an interface speed, an available capacity, and a use history of each external memory, and determining a priority of each external memory depending on the comparison result by the external memory comparing process.

The method may further include retrieving whether the same contents as the received contents are stored in the external memory.

The method may further include executing contents stored in the external memory via the interface.

The method may further include comparing a size of the received contents with an available capacity of the external memory, and when the available capacity of the external memory is equal to or greater than the size of the contents, determining a portion of the available capacity of the external memory to use as an external buffer.

The method may further include, when the available capacity of the external memory is less than the size of the contents, selecting a history to delete among a use history of the external memory.

Other aspects, advantages and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. Embodiments of the present disclosure will be described herein below with reference to the accompanying drawings.

Preferred embodiments of the present disclosure will be described herein below with reference to the accompanying drawings. In the following description, well-known functions or constructions are not described in detail since they would obscure the disclosure in unnecessary detail. And, terms described below, which are defined considering functions in the present disclosure, can be different depending on user and operator's intention or practice. Therefore, the terms should be defined based on the disclosure throughout this specification.

Figure 1:
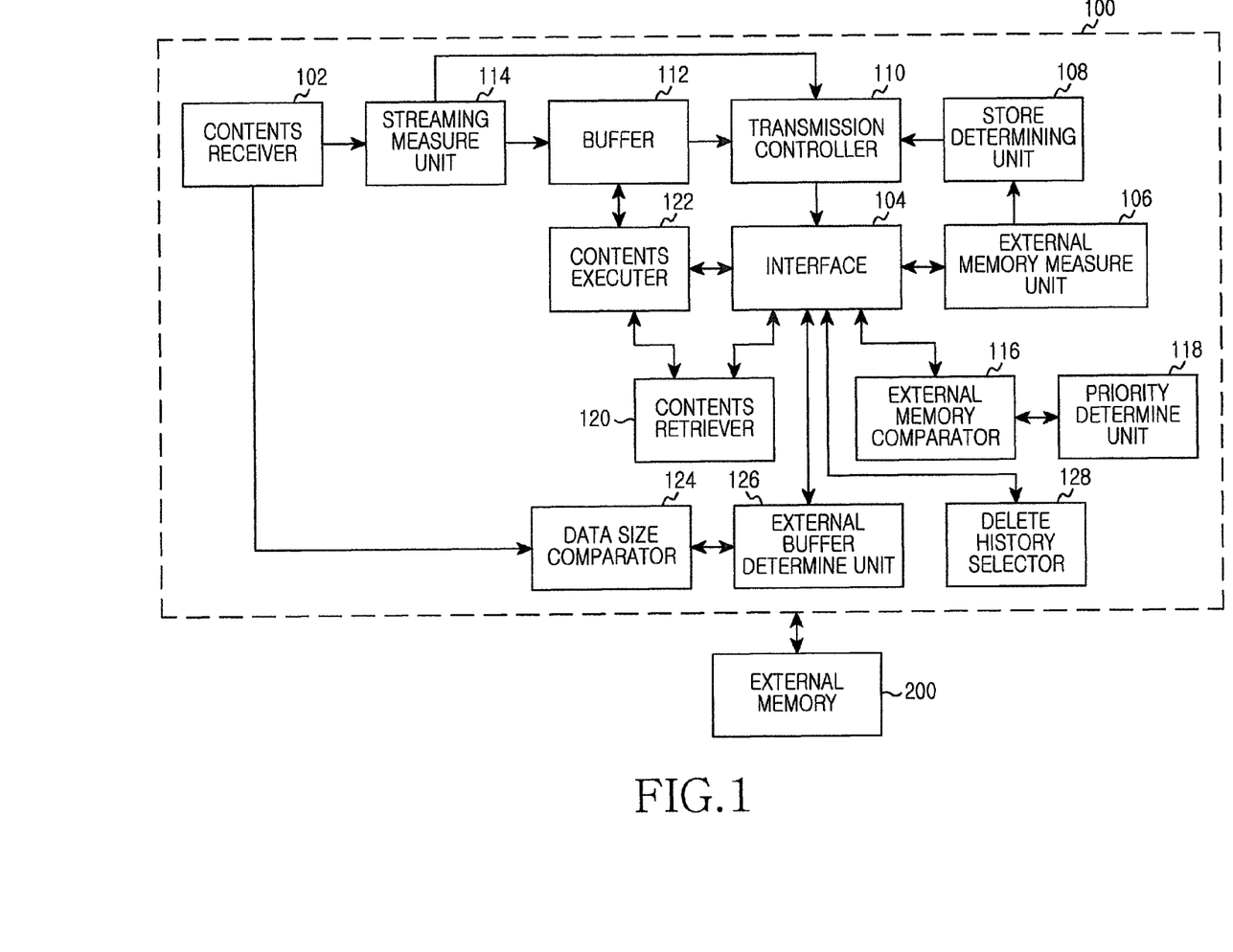
FIG. 1 illustrates a terminal capable of extending a storage space according to an exemplary embodiment of the present disclosure.

FIG. 1 illustrates a terminal capable of extending a storage space according to an exemplary embodiment of the present disclosure.

Referring to FIG. 1, the terminal 100 may include a contents receiver 102, an interface 104, an external memory measure unit 106, a store determining, unit 108, and a transmission controller 110.

In addition, the terminal 100 may further include a buffer 112, a streaming measure unit 114, an external memory comparator 116, a priority determine unit 118, a contents retriever 120, a contents executor 122, a data size comparator 124, an external buffer determine unit 126, and a delete history selector 128.

The contents receiver 102 may receive contents such as moving pictures, sounds, an image, etc. via a network or execute game contents together with a different terminal. Here, the network generally denotes a communication network such as CDMA, WCDMA, GSM, LTE, EPC, an access network of the next generation mobile communication system to be realized in the future, and a cloud computing access network between a cloud computing service providing apparatus and a terminal as well as the Internet network. The cloud computing denotes a computer environment where information is eternally stored in a server on the Internet and temporarily stored in a client terminal such as a desktop computer, a tablet computer, a notebook, a netbook, a smart phone, etc. A cloud computing access network denotes a computer environment access network for storing all information of a user in a server on the Internet and allowing a user to use this information via various Information Technology (IT) apparatuses any time, anywhere.

The interface 104 may access at least one external memory 200. Here, the interface 104 includes a short distance wireless communication interface for accessing the external memory 200 in a short distance wirelessly using short distance wireless communication such as Bluetooth, IrDA, Zigbee, UWB, NFC, etc., and a network interface for accessing a cloud server connected to a network using Wi-Fi, CDMA, WCDMA, GSM, LTE, EPC, etc. as well as a USB interface for accessing an external memory 200 directly connected with the terminal 100 via USB. At this point, the interface 104 may try an access by turning on the power of the terminal 100, or inserting a USB memory into a USB interface of the terminal 100, or periodically retrieving an external terminal 200 that can be communicated, existing within a predetermined range. This external memory accessing method uses a known method and detailed description thereof is omitted.

The external memory measure unit 106 measures at least one of a speed of the interface 104, an available capacity and a use history of the external memory 200 accessed via the interface 104. That is, the external memory measure unit 106 may measure a speed of data transmitted/received between the terminal 100 and the external memory 200 via the interface 104, and measure a storable capacity, file records stored in advance, etc. with respect to the accessed external memory 200.

The store determining unit 108 determines whether to store currently received contents in the external memory 200 based on a value measured by the external memory measure unit 106. That is, the store determining unit 108 may determine whether to store the received contents in the external memory 200 based on a measured speed of the interface 104, or determine whether to store the received contents based on whether the same contents as the currently received contents are stored in the external memory 200, the storable capacity of the external memory 200, or a combination of these.

When it is determined by the store determining unit 108 that the contents are stored in the external memory 200, the transmission controller 110 controls to transmit the contents to the external memory 200 via the interface 104.

The buffer 112 may store a multimedia streaming of contents received via a network. That is, a multimedia file such as a moving picture file, a sound file, etc. may be received in real-time in the form of streaming via the network. At this point, a unit of data received via the network is defined as a packet. The size of a packet may change depending on the kind of contents. In this example, the buffer 112 is intended for solving a speed difference between the speed of contents received via the network and a contents processing speed of the terminal 100. The buffer 112 may temporarily store received contents for a set time. At this point, the store determining unit 108 may compare the speed of the interface 104 with the storing/deleting speed of the buffer 112, or retrieve whether a space for storing contents remains in the buffer 112 to determine whether to store contents in the external memory 200.

The streaming measure unit 114 may measure at least one of the speed of multimedia streaming, and the size of a packet with respect to contents received via the network. That is, in the case where a multimedia stream for contents such as moving pictures, sounds, games, etc. is received via the network, the streaming measure unit 114 may measure the speed of the received multimedia stream, the size of a packet, etc. In this example, the store determining unit 108 may compare a value measured by the streaming measure unit 114 with a value measured by the external memory measure unit 106 to determine whether to store the contents in the external memory 200 on a packet basis.

In the case where a plurality of external memories 200 are accessed via the interface 104, the external memory comparator 116 may compare at least one of an interface speed, an available capacity and a use history of each external memory 200. For example, in the case where a plurality of USB memories are accessed via a USB interface, the external memory comparator 116 may compare an available capacity of each USB memory. Alternatively, in the case where a USB memory is accessed via the USB interface, and simultaneously, a short distance wireless communication memory is accessed via a short distance wireless communication interface, the external memory comparator 116 may compare an interface speed and an available capacity of each accessed external memory 200.

The priority determine unit 118 may determine a priority of each external memory 200 accessed via the interface 104 depending on a comparison result by the external memory comparator 116. For example, in the case where external memories are accessed via the USB interface and the short distance wireless communication interface, respectively, and respective available capacities are the same, and the speed of the USB interface is faster than the short distance wireless communication interface by a set value, the priority may be determined such that contents received via the network is primarily stored in the USB memory accessed via the USB interface and secondarily stored in the external memory accessed via the short distance wireless communication interface in the case where an available capacity of the USB memory is equal to or less than a set value. At this point, the priority determine unit 118 may determine a priority of each memory 200 with consideration of a speed difference of each interface, an available capacity difference of each external memory, and whether the same contents as received contents are stored in each external memory.

The contents retriever 120 retrieves whether the same contents as contents received via the network are stored in the external memory 200 accessed via the interface 104. At this point, the contents retriever 120 may retrieve whether the same contents are stored in the external memory 200 on a packet basis with respect to a multimedia stream received on a packet basis.

The contents executor 122 may execute contents stored in the external memory 200 via the interface 104. That is, contents may be transmitted to the external memory 200 by the transmission controller 110, or in the case where the contents retriever 120 retrieves that the same contents as currently received contents are stored in the external memory 200, the contents executor 122 may receive and execute the contents stored in the external memory 200 via the interface 104.

The data size comparator 124 may compare the size of contents received via the network with an available capacity of the external memory 200 accessed via the interface 104. At this point, the data size comparator 124 may compare the size of a packet with an available capacity of the external memory 200 with respect to contents received in the form of a multi-stream.

In the case where the available capacity of the external memory 200 is equal to or greater than the size of contents or the size of a packet, the external buffer determine unit 126 may determine a capacity to use as an external buffer among the available capacity of the external memory 200. In this example, it is preferable that the size of a capacity to use as the external buffer is set to a value greater than the size of a packet of contents received in the form of a multi-stream.

In the case where the available capacity of the external memory 200 is less than the size of contents or the size of a packet, the delete history selector 128 may select a history to delete among a use history of the external memory 200. At this point, the delete history selector 128 allows a user to select a delete history or allows contents to be sequentially deleted in a preceding order among contents of a packet basis stored in the external memory 200 by providing a use history of the external memory 200 in the form of a select menu to the user.

Figure 2:
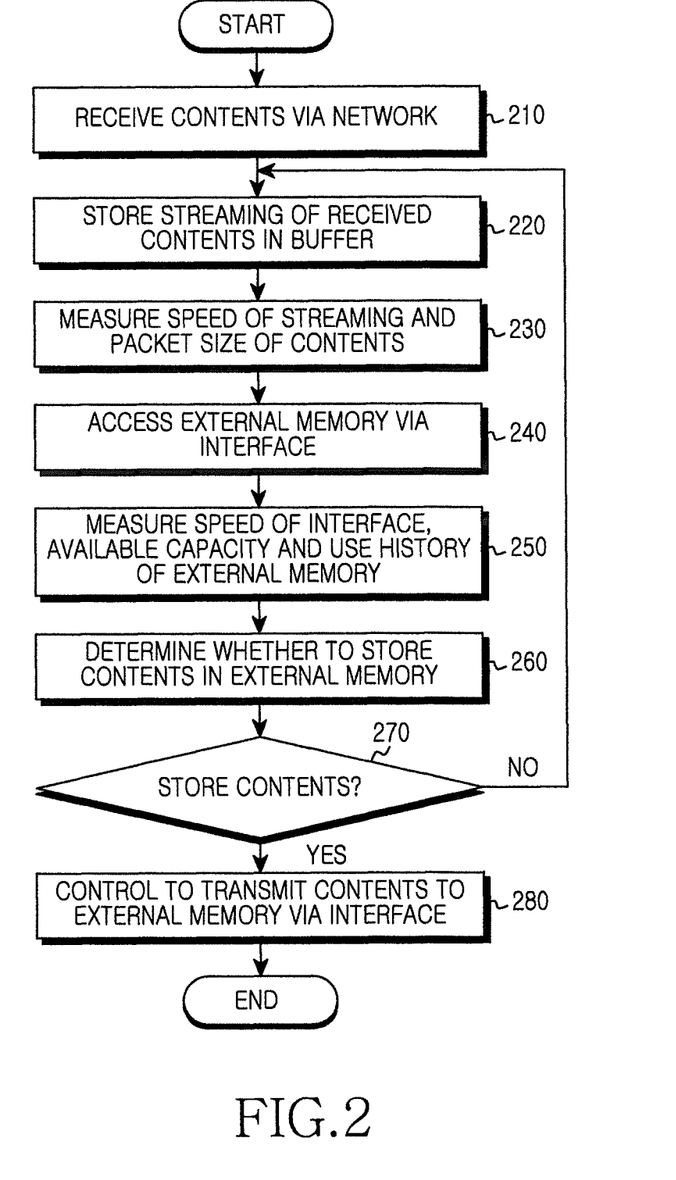
FIG. 2 illustrates a method for extending a storage space according to an exemplary embodiment of the present disclosure.

FIG. 2 illustrates a method for extending a storage space according to an exemplary embodiment of the present disclosure.

Referring to FIGS. 1 and 2, the contents receiver 102 may receive contents such as moving pictures, sounds, an image, etc. via a network, or transmit/receive game contents to/from other terminals via the network (210).

The buffer 112 may temporarily store a multimedia stream of received contents for a set time in order to solve a speed difference between the speed of the contents received via the network and the contents processing speed of the terminal 100 (220). At this point, the buffer 112 may store the multimedia stream of the received contents on a packet basis.

The streaming measure unit 114 may measure at least one of the multimedia streaming speed and a packet size with respect to contents received via the network (230). That is, when a multimedia stream of contents such as moving pictures, sounds, games, etc. is received via the network, the streaming measure unit 114 may measure the speed of the received multimedia stream, and the packet size, etc.

When the external memory 200 is accessed via at least one of a USB interface, a short distance wireless communication interface, and a network interface (240), the external memory measure unit 106 measures at least one of the speed of the interface 104, an available capacity and a use history of the external memory 200 accessed via the interface 104 (250). At this point, the external memory measure unit 106 may measure the speed of data transmitted/received between the terminal 100 and the external memory 200 via the interface 104, and measure a storable capacity, file records stored in advance, and whether the same contents as contents currently received via the network are stored with respect to the accessed external memory 200.

The store determining unit 108 determines whether to store currently received contents in the external memory 200 based on a value measured by the external memory measure unit 106 (260). That is, the store determining unit 108 may determine whether to store the received contents in the external memory 200 based on the measured speed of the interface 104, or determine whether to store the received contents based on whether the same contents as the currently received contents are stored in the external memory 200, the storable capacity of the external memory 200, or a combination of these.

Alternatively, the store determining unit 108 may compare a value measured by the steaming measure unit 114 with a value measured by the external memory measure unit 106 to determine whether to store contents in the external memory 200 on a packet basis.

Alternatively, the store determining unit 108 may compare the speed of the interface 104 with a store/delete speed of the buffer 112, or retrieve whether a space for storing contents remains in the buffer 112 to determine whether to store contents in the external memory 200.

When it is determined by the store determining unit 108 that contents are stored in the external memory 200 (270), the transmission controller 110 controls to transmit the contents to the external memory 200 via the interface 104 (280).

The contents executor 122 may execute contents stored in the external memory 200 via the interface 104.

Therefore, the speed of the multimedia stream of the received contents, the size of a packet, etc. are measured, and accordingly, the contents may be automatically transmitted to the external memory, and the contents stored in the external memory may be executed, so that the buffer may be automatically extended to the external memory in the case where the available capacity of the buffer installed inside the terminal is insufficient.

Figure 3:
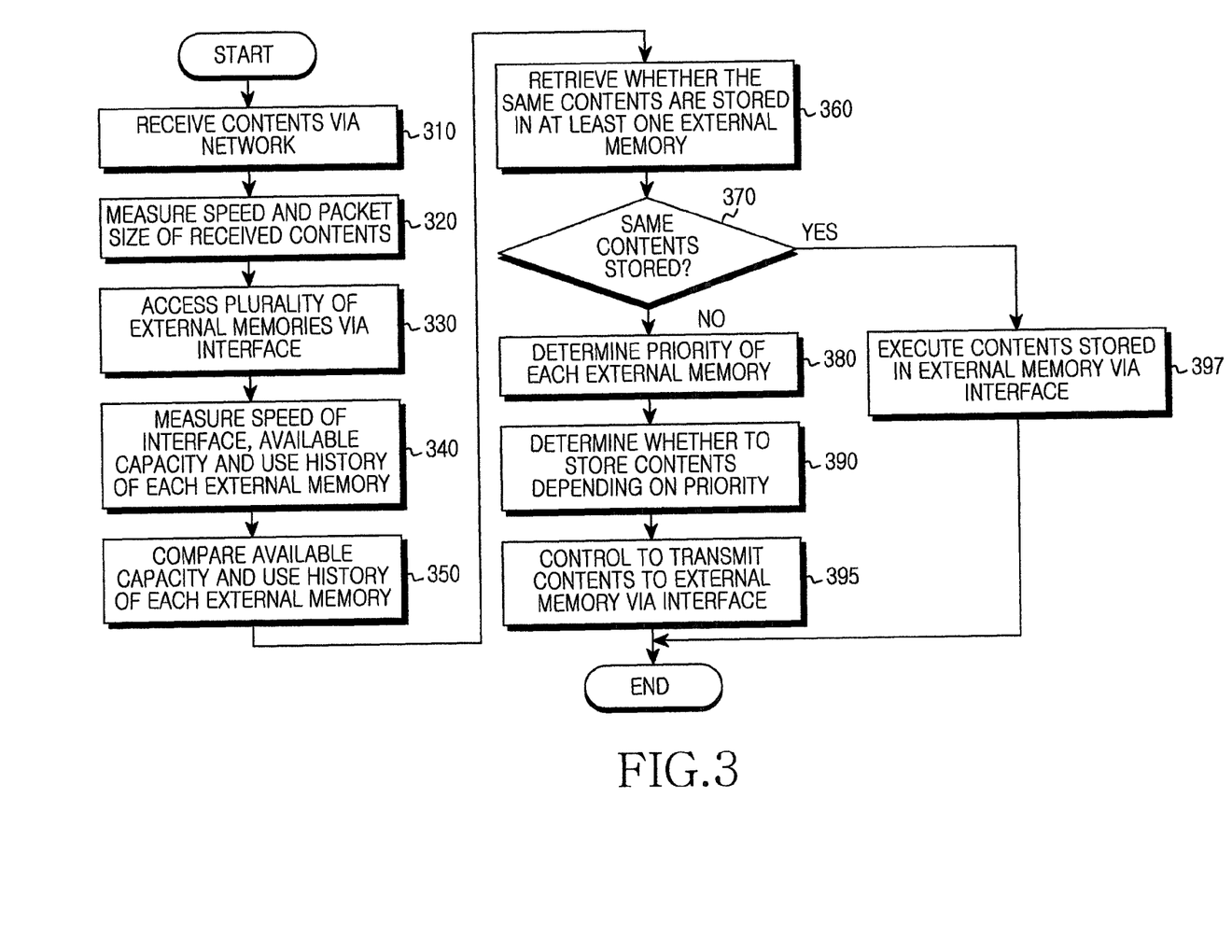
FIG. 3 illustrates a method for extending a storage space according to another exemplary embodiment of the present disclosure.

FIG. 3 illustrates a method for extending a storage space according to another exemplary embodiment of the present disclosure.

Referring to FIGS. 1 and 3, the contents receiver 102 may receive contents such as moving pictures, sounds, an image, etc. via a network, or transmit/receive game contents to/from other terminals via the network (310).

The streaming measure unit 114 may measure at least one of a multimedia streaming speed, and a packet size with respect to contents received via the network (320). That is, when a multimedia stream of contents such as moving pictures, sounds, games, etc. is received via the network, the streaming measure unit 114 may measure the speed, the packet size, etc. of the received multimedia stream.

The interface 104 may try an access by turning on the power of the terminal 100, inserting a USB memory into the USB interface of the terminal 100, or periodically retrieving an external terminal that can be communicated, existing within a predetermined range. At this point, the interface 104 may simultaneously access a plurality of external memories 200 (330). For example, the interface 104 may simultaneously access a plurality of USB memories connected via a plurality of USB interfaces, and simultaneously access a USB memory connected via the USB interface and the external memory 200 connected via a short distance wireless communication interface.

The external memory measure unit 106 measures at least one of the speed of each interface 104, available capacities and use histories of respective external memories 200 accessed via a plurality of interfaces 104 with respect to respective external memories 200 connected via the plurality of interfaces 104 (340). That is, the external memory measure unit 106 may measure the speed of data transmitted/received between the terminal 100 and each external memory 200, and measure a storable capacity, file records stored in advance, etc. with respect to the respective connected external memories 200.

In the case where the plurality of external memories 200 are accessed via the interface 104, the external memory comparator 116 may compare at least one of an interface speed, an available capacity, and a use history of each external memory 200 (350). For example, in the case where a plurality of USB memories are accessed via a USB interface, the external memory comparator 116 may compare the available capacity of each USB memory. Alternatively, in the case where a USB memory is accessed via the USB interface, and simultaneously, a short distance wireless communication memory is accessed via the short distance wireless communication interface, the external memory comparator 116 may compare an interface speed and an available capacity of each accessed external memory 200.

The contents retriever 120 may retrieve whether the same contents as contents received via the network are stored in the external memory 200 accessed via the interface 104 (360). At this point, the contents retriever 120 may retrieve whether the same contents are stored in the external memory 200 on a packet basis with respect to a multimedia stream received on a packet basis.

When it is retrieved by the contents retriever 120 that the same contents as the contents received via the network are not stored in any of the plurality of external memories 200, the store determining unit 108 may determine whether to store the currently received contents in at least one of the plurality of external memories 200 (370).

At this point, the priority determine unit 118 may determine a priority of each external memory 200 accessed via the interface 104 depending on a comparison result by the external memory comparator 116 (380). In this example, the priority determine unit 118 may determine the priority of each external memory 200 with consideration of a speed difference of each interface, a difference in an available capacity of each external memory 200, and whether the same contents as received contents are stored in each external memory.

In addition, the priority determine unit 118 may determine to store the received contents in an external memory 200 of a first priority depending on a determined priority for the plurality of external memories 200, or determine to sequentially store the contents according to the priority (390). For example, in the case where external memories are accessed via the USB interface and the short distance wireless communication interface, respectively, and respective available capacities are the same, and the speed of the USB interface is faster than the speed of the short distance wireless communication interface by a set value or more, the priority determine unit 118 may determine the priority such that contents received via the network are primarily stored in the USB memory accessed via the USB interface and the contents are secondarily stored in the external memory accessed via the short distance wireless communication interface in the case where the available capacity of the USB memory is equal to or less than a set value.

The transmission controller 110 controls to transmit currently received contents to an external memory of a first priority among the plurality of external memories 200 or controls to sequentially transmit the contents depending on the priority determined by the priority determine unit (395).

In the case where the contents retriever 120 retrieves the same contents stored in at least one of the plurality of external memories 200 with respect to the contents received via the network, the store determining unit 108 may determine not to store the received contents in the external memory 200. In this example, the contents executor 122 may execute the contents stored in the relevant external memory 200 (397).

Therefore, in the case where a plurality of external memories are accessed via the interface, a best method for the plurality of external memories may be selected, so that an external memory may be extended.

Figure 4:
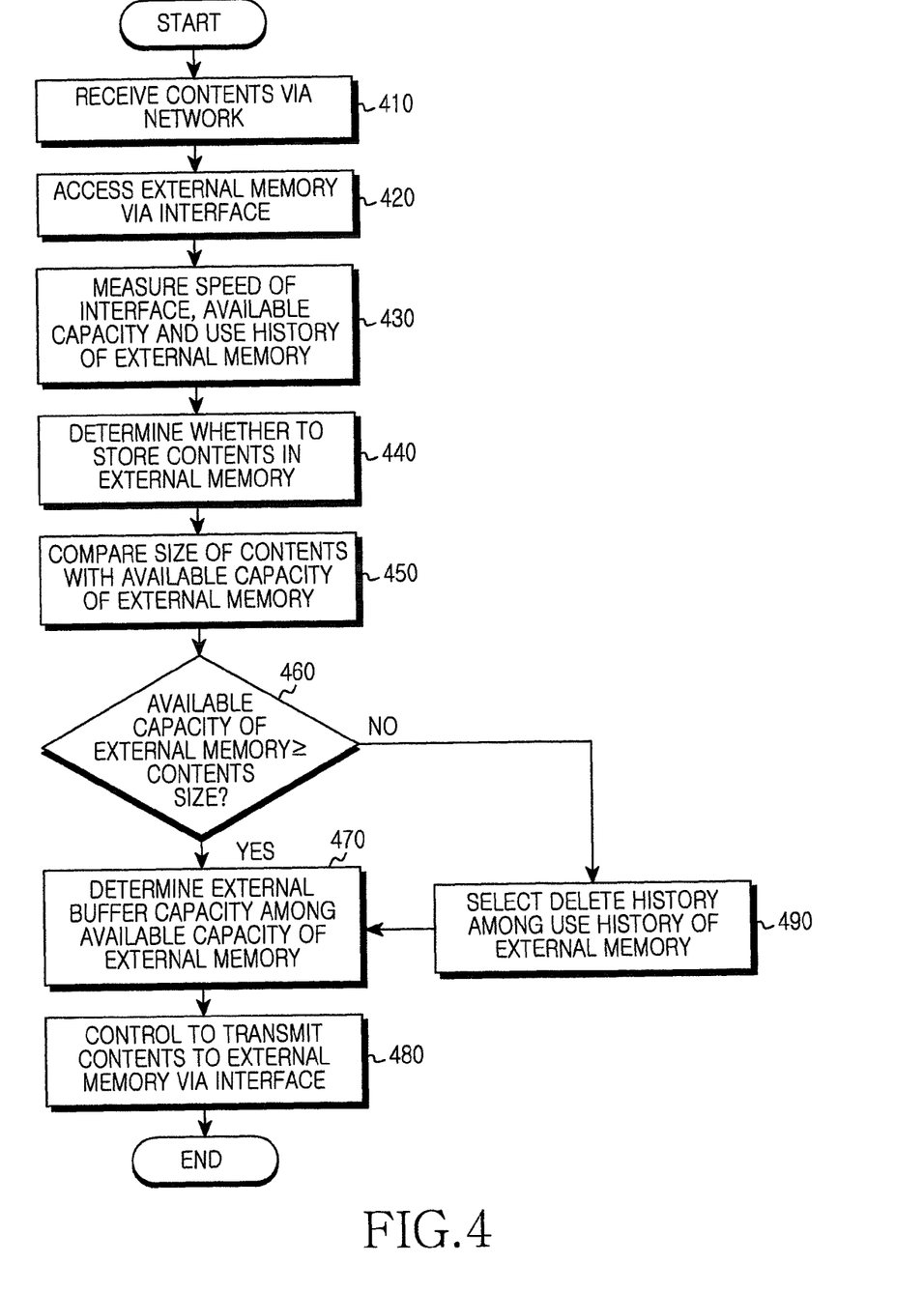
FIG. 4 illustrates a method for extending a storage space according to another exemplary embodiment of the present disclosure.

FIG. 4 illustrates a method for extending a storage space according to another exemplary embodiment of the present disclosure.

Referring to FIGS. 1 and 4, the contents receiver 102 may receive contents such as moving pictures, sounds, an image, etc. via a network, or transmit/receive game contents to/from other terminals via the network (410).

When the external memory 200 is accessed via at least one of the USB interface, the short distance wireless communication interface, and the network interface (420), the external memory measure unit 106 measures at least one of the speed of the interface 104, the available capacity and the use history of the external memory 200 accessed via the interface 104 (430). At this point, the external memory measure unit 106 may measure the speed of data transmitted/received between the terminal 100 and the external memory 200 via the interface 104, and may measure a storable capacity, file records stored in advance, and whether the same contents as contents currently received via the network are stored with respect to the accessed external memory 200.

The store determining unit 108 determines whether to store the currently received contents in the external memory 200 based on a value measured by the external memory measure unit 106 (440). That is, the store determining unit 108 may determine whether to store the received contents in the external memory 200 based on the measured speed of the interface 104, or determine whether to store the received contents based on whether the same contents as the currently received contents are stored in the external memory 200, the storable capacity of the external memory 200, or a combination of these.

In the example where it is determined that the contents are stored in the external memory 200, the data size comparator 124 may compare the size of the contents received via the network with the available capacity of the external memory 200 (450).

When it is determined by the data size comparator 124 that the available capacity of the external memory 200 is equal to or greater than the received contents (460), the external buffer determine unit 126 may determine a capacity to use as an external buffer among the available capacity of the external memory 200 (470). At this point, in the example where contents are received in the form of a multimedia stream of a packet basis, the external buffer determine unit 126 may determine the capacity of the external buffer equal to or greater than the packet size.

The transmission controller 110 controls to transmit contents received via the network to an external buffer inside the external memory 200 via the interface 104 (480). At this point, the contents executor 122 may execute the contents stored in the external buffer via the interface 104, thereby extending the buffer using the external memory 200 in the example where the available capacity of the buffer 112 is insufficient with respect to received contents.

When it is determined by the data size comparator 124 that the available capacity of the external memory 200 is less than the size of received contents (460), the delete history selector 128 may select and delete a history to delete among a use history stored in advance in the external memory 200 (490). Therefore, in the example where the available capacity of the buffer 112 is insufficient and the available capacity of the external memory 200 is insufficient, a portion of a use history of the external memory 200 is deleted and the available capacity is extended, so that the external buffer may be extended.

According to an exemplary embodiment of the present disclosure, when large capacity contents such as moving pictures, games, etc. are received and executed via the network, an external memory is accessed via a USB interface, a short distance wireless communication interface, a network interface, etc. installed in a terminal, and a buffer required for reproducing the contents is extended using the accessed external memory, so that disconnection of the contents may be prevented.

In addition, according to an exemplary embodiment of the present disclosure, in the example where a user performs manipulation such as forward, backward, etc. on contents of the same content, the contents stored in an external memory may be reproduced even when the capacity of the buffer for storing streaming is insufficient, so that performing of repetitive buffering may be prevented.

It will be appreciated that embodiments of the present disclosure according to the claims and description in the specification can be realized in the form of hardware, software or a combination of hardware and software.

Any such software may be stored in a computer readable storage medium. The computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present disclosure.

Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

Although the disclosure has been shown and described with reference to certain exemplary embodiments thereof, it will be understood by those skilled in the art that various changes in form and details may be made therein without departing from the spirit and scope of the disclosure as defined by the appended claims and their equivalents. Therefore, the scope of the present disclosure should not be limited to the above-described embodiments but should be determined by not only the appended claims but also the equivalents thereof.

What is claimed is:

1. A terminal configured to extend a storage space, the terminal comprising:
   a receiver configured to receive contents via a network;
   an interface configured to access at least one external memory; and
   a controller configured to:
   measure at least one of a speed and a packet size of a multimedia stream associated with the received contents,
   measure at least one of a speed of the interface, an available capacity and a use history of the external memory accessed via the interface,
   compare a value of the at least one of a speed and a packet size of the multimedia stream with a value of the at least one of the speed of the interface, the available capacity and the use history of the external memory to determine whether to store the contents on a packet basis,
   determine whether to store the contents in the external memory based on the value of the at least one of the speed of the interface, the available capacity and the use history of the external memory, and
   control to transmit the contents to the external memory via the interface when it is determined that the contents are to be stored in the external memory.

2. The terminal of claim 1, further comprising a buffer configured to store a multimedia stream for the received contents,
   wherein the controller is configured to determine to store the contents in the external memory when a capacity of the buffer is insufficient.

3. The terminal of claim 1, wherein the controller is further configured to:
   when a plurality of external memories are accessed via the interface, compare at least one of an interface speed, an available capacity, and a use history of each external memory of the plurality of external memories; and
   determine a priority of each external memory depending on the comparison.

4. The terminal of claim 1, wherein the controller is further configured to determine whether stored contents that are the same as the received contents are stored in the external memory.

5. The terminal of claim 4, wherein the controller is further configured to execute contents stored in the external memory via the interface.

6. The terminal of claim 1, wherein the controller is further configured to:
   compare a size of the contents with an available capacity of the external memory; and
   when the available capacity of the external memory is equal to or greater than the size of the contents, determine a portion of the available capacity of the external memory to use as an external buffer.

7. The terminal of claim 6, wherein the controller is further configured to:
   when the available capacity of the external memory is less than the size of the contents, select a history to delete among a use history of the external memory.

8. The terminal of claim 1, wherein the interface comprises at least one of:
   a Universal Serial Bus (USB) interface configured to access the at least one external memory via a USB;
   a short distance wireless communication interface configured to access the at least one external memory using short distance wireless communication comprising at least one of Bluetooth, Infrared Data Association (IrDA), Zigbee, Ultra Wideband (UWB), and Near Field Communication (NFC); and
   a network interface configured to access a cloud server connected to the network using at least one of Wi-Fi, Code Division Multiple Access (CDMA), Wideband CDMA (WCDMA), Global System for Mobile Communication (GSM), Long Term Evolution (LTE), and Evolved Packet Core (EPC).

9. The terminal of claim 1, wherein the interface comprises a wireless network interface configured to access a cloud server connected to the network using a wireless connection.

10. A method for extending a storage space of a terminal, the method comprising:
    receiving contents via a network;
    measuring at least one of a speed and a packet size of a multimedia stream associated with the received contents,
    accessing at least one external memory connected via an interface;
    measuring at least one of a speed of the interface, an available capacity and a use history of the external memory accessed via the interface;
    comparing a value of the at least one of a speed and a packet size of the multimedia stream with a value of the at least one of the speed of the interface, the available capacity and the use history of the external memory to determine whether to store the contents on a packet basis; and determining whether to store the contents in the external memory based on the value of the at least one of the speed of the interface, the available capacity and the use history of the external memory;

when determining to store the contents in the external memory, controlling to transmit the contents to the external memory via the interface.

11. The method of claim 10, wherein the interface comprises at least one of:
   a Universal Serial Bus (USB) interface for accessing the at least one external memory via a USB;
   a short distance wireless communication interface for accessing the at least one external memory using short distance wireless communication comprising at least one of Bluetooth, Infrared Data Association (IrDA), Zigbee, Ultra Wideband (UWB), and Near Field Communication (NFC); and
   a network interface for accessing a cloud server connected to the network using at least one of Wi-Fi, Code Division Multiple Access (CDMA), Wideband CDMA (WCDMA), Global System for Mobile Communication (GSM), Long Term Evolution (LTE), and Evolved Packet Core (EPC).

12. The method of claim 10, further comprising storing a multimedia stream for the received contents in a buffer,
   wherein determining whether to store the contents in the external memory comprises determining to store the contents in the external memory when a capacity of the buffer is insufficient.

13. The method of claim 10, further comprising:
   when a plurality of external memories are accessed via the interface, comparing at least one of an interface speed, an available capacity, and a use history of each external memory of the plurality of external memories to form a comparison result; and
   determining a priority of each external memory depending on the comparison result.

14. The method of claim 10, further comprising determining whether stored contents that are the same as the received contents are stored in the external memory.

15. The method of claim 14, further comprising executing contents stored in the external memory via the interface.

16. The method of claim 10, further comprising:
   comparing a size of the received contents with an available capacity of the external memory; and
   when the available capacity of the external memory is equal to or greater than the size of the contents, determining a portion of the available capacity of the external memory to use as an external buffer.

17. The method of claim 16, further comprising, when the available capacity of the external memory is less than the size of the contents, selecting a history to delete among a use history of the external memory.

18. The method of claim 10, wherein the interface comprises a wireless network interface configured to access a cloud server connected to the network using a wireless connection.

* * * * *